(12) United States Patent
Jacobs et al.

(10) Patent No.: US 10,970,169 B2
(45) Date of Patent: Apr. 6, 2021

(54) DATA CONFIGURATION MANAGEMENT SYSTEM FOR AN ENGINE

(71) Applicant: General Electric Company, Schenectady, NY (US)

(72) Inventors: Douglas Scott Jacobs, Boston, MA (US); Charles William Dowdell, Ipswich, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/454,929

(22) Filed: Jun. 27, 2019

(65) Prior Publication Data

US 2020/0409792 A1    Dec. 31, 2020

(51) Int. Cl.
   *G11C 29/00*   (2006.01)
   *G06F 11/10*   (2006.01)
   *B64D 31/06*   (2006.01)
   *F02C 9/00*    (2006.01)

(52) U.S. Cl.
   CPC .......... *G06F 11/1076* (2013.01); *B64D 31/06* (2013.01); *F02C 9/00* (2013.01)

(58) Field of Classification Search
   None
   See application file for complete search history.

(56) References Cited

U.S. PATENT DOCUMENTS

| | | |
|---|---|---|
| 5,033,010 A | 7/1991 | Lawrence et al. |
| 6,832,178 B1 | 12/2004 | Fernandez et al. |
| 7,028,139 B1 * | 4/2006 | Kiselev ............... G06F 11/1076 711/114 |
| 7,501,968 B2 | 3/2009 | DuPuis et al. |
| 7,511,259 B2 | 3/2009 | Nyffenegger et al. |
| 7,693,687 B2 | 4/2010 | Lev-Ami et al. |
| 7,769,510 B2 | 8/2010 | Denholm et al. |
| 7,929,374 B1 | 4/2011 | Grimmett |
| 7,984,199 B2 | 7/2011 | Ferguson et al. |
| 8,510,234 B2 | 8/2013 | Maldonado Diaz et al. |
| 8,862,289 B2 | 10/2014 | Fossion et al. |

(Continued)

OTHER PUBLICATIONS

U.S. Appl. No. 15/887,025, filed Feb. 2, 2018.

(Continued)

*Primary Examiner* — Guerrier Merant
(74) *Attorney, Agent, or Firm* — Dority & Manning, P.A.

(57) ABSTRACT

A distributed control system for a vehicle includes a configuration controller and at least three nodes communicatively coupled to the configuration controller. Each of the at least three nodes includes a memory device for storing local data and portions of shared data of the distributed control system. Further, portions of the shared data are dissimilarly copied across the at least three nodes using dissimilar methods. More specifically, the dissimilar methods include at least one of striping the shared data amongst the at least three nodes, storing parity information of the shared data amongst at least one of the at least three nodes, storing unique identification or signatory information of the shared data amongst at least one of the at least three nodes, storing subsets of the shared data amongst the at least three nodes, and/or storing exact copies of the shared data amongst at least one of the at least three nodes so as to increase redundancy of the shared data.

17 Claims, 9 Drawing Sheets

(56) References Cited

U.S. PATENT DOCUMENTS

| | | |
|---|---|---|
| 9,120,581 B2 | 9/2015 | Costes et al. |
| 9,239,578 B2 | 1/2016 | Ziarno |
| 9,607,452 B2 | 3/2017 | Sobanski |
| 9,630,510 B2 | 4/2017 | Sukumaran et al. |
| 9,727,059 B2 | 8/2017 | Greenfield et al. |
| 9,788,085 B2 | 10/2017 | Rencher et al. |
| 2005/0204097 A1* | 9/2005 | Kistler ............... G06F 11/3485 711/114 |
| 2015/0251770 A1 | 9/2015 | Bisson et al. |
| 2017/0021936 A1 | 1/2017 | Nagashima |
| 2018/0043636 A1 | 2/2018 | Flannigan et al. |
| 2018/0114199 A1 | 4/2018 | Sahay et al. |
| 2019/0121889 A1* | 4/2019 | Gold ...................... G06F 3/061 |
| 2019/0163764 A1* | 5/2019 | Ioannou .................. G06F 3/067 |
| 2020/0125447 A1* | 4/2020 | Hosmani ............... G06F 3/0689 |

OTHER PUBLICATIONS

Adibhatla, Advanced Controls and PHM GE Aviation Perspective, PCD Conference NASA GRC, https://www.grc.nasa.gov/www/cdtb/aboutus/workshop2009/GE-Aviation_Adibhatla.pdf, Dec. 8, 2009, pp. 1-23.

International Search Report Corresponding to Application No. PCT/US2020/040094 received by law firm on Sep. 28, 2020.

Alima et al., "A Survey of Concepts, Techniques, and Systems for High Availability Computing." Feb. 19, 2002, pp. 1-171.

\* cited by examiner

DATA CONFIGURATION MANAGEMENT SYSTEM FOR AN ENGINE

FIELD

The present disclosure relates generally to control systems for a vehicle and more particularly, to a data configuration management system for an engine having line-replaceable unit (LRUs) or nodes configured for storing shared data, with the shared data being spread across the nodes in dissimilar methods.

BACKGROUND

An engine controller configured to control operation of a gas turbine engine traditionally receives configuration data for the gas turbine engine via a plug-based system that stores a single hardware copy of the configuration data. The plug-based system may include one or more plugs configured to store the configuration data. For example, the plug-based system may include an engine rating plug, a configuration plug, or both. More specifically, the engine rating plug may provide data indicative of a thrust rating for the gas turbine engine. Alternatively or additionally, the configuration plug may provide data indicative of one or more configuration settings for a core module or hardware variant of the gas turbine engine. The one or more plugs may be communicatively coupled to the engine controller. In this manner, the engine controller may be configured to control operation of the gas turbine engine differently based on the data received from the plug(s).

However, the plug(s) add to the overall weight and cost of the gas turbine engine, which is generally undesirable. Recent systems have looked into distributed memory to serve this purpose, but such systems require many large memory devices and thus large bandwidth requirements to communicate this information.

Accordingly, the present disclosure is directed to an improved engine management controller that allows for variously sized and even very small memory devices to be used in each location but which still retain the full amount of available engine information with the removal and replacement of any of the LRUs. Thus, the engine controller of the present disclosure simplifies the system and has reduced overall weight and complexity as compared to conventional controllers.

BRIEF DESCRIPTION

Aspects and advantages of the present disclosure will be set forth in part in the following description, or may be obvious from the description, or may be learned through practice of the present disclosure.

In one aspect, the present disclosure is directed to a distributed control system for a vehicle. The distributed control system includes a configuration controller and at least three nodes communicatively coupled to the configuration controller. Each of the at least three nodes includes a memory device for storing local data and portions of shared data of the distributed control system. Further, portions of the shared data are dissimilarly copied across the at least three nodes using dissimilar methods. More specifically, the dissimilar methods include at least one of striping the shared data amongst the at least three nodes, storing parity information of the shared data amongst at least one of the at least three nodes, storing unique identification or signatory information of the shared data amongst at least one of the at least three nodes, storing subsets of the shared data amongst the at least three nodes, and/or storing exact copies of the shared data amongst at least one of the at least three nodes so as to increase redundancy of the shared data.

In an embodiment, the dissimilar methods accommodate a memory storage capacity of the at least one of the three nodes being less than a memory storage capacity of another one or more of the at least three nodes. In another embodiment, storing subsets of the shared data amongst the at least three nodes further comprises defining the subsets based on a priority of each of the subsets of the shared data.

In one embodiment, the subsets of the shared data, data redundancy, the parity information, and/or subset definitions may be dynamically allocated and modified based on the current criticality of the data.

In further embodiments, striping the shared data amongst each of the at least three nodes and/or storing the parity information of the shared data amongst each of the at least three nodes may include storing the shared data using a redundant array of independent disks (RAID) methodology.

In additional embodiments, the configuration controller may be configured to perform a plurality of operations, including but not limited to obtaining an instance of the shared data for the vehicle control system from the at least three separate nodes, at least two of the instances being dissimilar, regenerating comparably similar information sets of the shared data from the instances of the shared data including the dissimilar instances of the shared data, comparing the comparably similar information sets of the shared data, detecting a shared data inconsistency amongst any of the at least three nodes based on the comparison, and responsive to detecting the shared data inconsistency, generating a control action associated with resolving the shared data inconsistency.

In an embodiment, the configuration controller may perform the plurality of operations each time the distributed control system is initialized.

In another embodiment, each node of the at least three nodes comprises at least one of a sensor, actuator, data concentrator, or controller.

In several embodiments, the parity information may include at least one of a parity of the subsets of shared data, checksums of the shared data, and/or hashs of the shared data.

In further embodiments, the vehicle control system may include an engine control system for a gas turbine engine. In such embodiments, the shared data may include configuration data for the gas turbine engine and/or engine health data for the gas turbine engine.

In still a further embodiment, the vehicle control system may include a plurality of engine control systems for a plurality of gas turbine engines. In such embodiments, the shared data may include configuration data for the plurality of gas turbine engines and/or engine health data for the plurality of gas turbine engines.

In yet another embodiment, the configuration data may include a thrust rating for the gas turbine engine and/or calibration data for one or more components of the gas turbine engine. In further embodiments, the engine health data may include data indicating a number of flight hours or operating hours for the gas turbine engine, data indicating a number of cycle events for the gas turbine engine, and/or data indicating a number of times the gas turbine engine has been operated at one or more predefined conditions.

In another aspect, the present disclosure is directed to a distributed vehicle control system for a plurality of vehicles. The distributed control system includes a first engine control system and a second control system. The first and second control systems each includes a configuration controller and at least three nodes communicatively coupled thereto. Each of the at least three nodes includes a memory device for storing local data and portions of shared data of the first and second control systems. The portions of the shared data are dissimilarly copied across the at least three nodes using dissimilar methods. Further, the dissimilar methods includes striping the shared data amongst the at least three nodes, storing parity information of the shared data amongst at least one of the at least three nodes, storing unique identification or signatory information of the shared data amongst at least one of the at least three nodes, storing subsets of the shared data amongst the at least three nodes, and/or storing exact copies of the shared data amongst at least one of the at least three nodes so as to increase redundancy of the shared data. It should be understood that the distributed vehicle control system may further include any of the additional features described herein.

In another aspect, the present disclosure is directed to a method for managing gas turbine engine data configuration. The method includes responsive to detecting initialization of an engine controller for a gas turbine engine, obtaining, by one or more processors of a distributed control system, one or more instances of shared data for an engine control system for the gas turbine engine from each of at least three nodes of the distributed control system, the shared data being dissimilarly copied across the at least three nodes using dissimilar methods. The method also includes creating comparably similar information sets of the shared data from the one or more instances of the shared data. Further, the method includes comparing, by the one or more processors, the comparably similar information sets of the shared data. Moreover, the method includes detecting, by the one or more processors, a shared data inconsistency amongst any of the at least three instances based on comparing the at least three instances of shared data. In addition, the method includes responsive to detecting the shared data inconsistency, generating a control action associated with resolving the shared data inconsistency.

It should be understood that the method may further include any of the additional features and/or steps described herein.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which.

DETAILED DESCRIPTION

Figure 1:
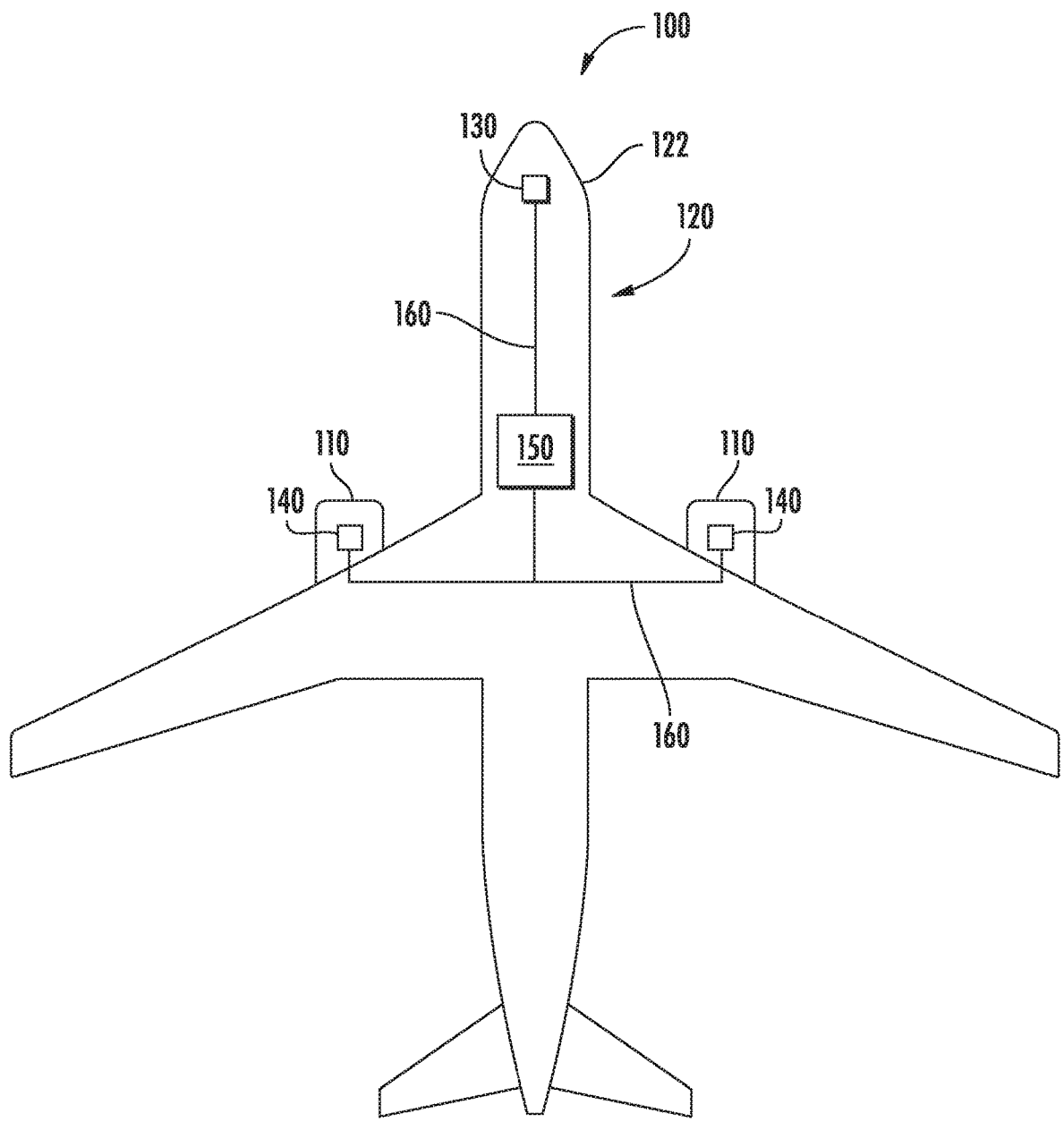
FIG. 1 illustrates a schematic diagram of one embodiment of an aerial vehicle according to the present disclosure.

Reference will now be made in detail to present embodiments of the present disclosure, one or more examples of which are illustrated in the accompanying drawings. The detailed description uses numerical and letter designations to refer to features in the drawings.

As used in the specification and the appended claims, the terms "first" and "second" may be used interchangeably to distinguish one component from another and are not intended to signify location or importance of the individual components. The singular forms "a", "an", and "the" include plural references unless the context clearly dictates otherwise. The use of the term "about" in conjunction with a numerical value refers to within 25% of the stated amount.

Referring now to FIG. 1, an aerial vehicle 100 according to one embodiment of the present disclosure is illustrated. As shown, the aerial vehicle 100 may include one or more gas turbine engine(s) 110, a fuselage 120, a cockpit 122, a display 130 for displaying information to the flight crew, and one or more engine controller(s) 140 configured to control operation of the one or more engine(s) 110. For example, as depicted in FIG. 1, the aircraft 100 includes two gas turbine engines 110 that are controlled by their respective engine controllers 140. For this embodiment, the aircraft 100 includes one engine 110 mounted to or integral with each wing of the aircraft 100. Each engine controller 140 may include, for example, an Electronic Engine Controller (EEC) or an Electronic Control Unit (ECU) of a Full Authority Digital Engine Control (FADEC). Each engine controller 140 includes various components for performing various operations and functions, such as e.g., for collecting and storing flight data from one or more engine or aircraft sensors or control ling thrust or power of the engine. Although FIG. 1 shows individual engine controllers for each engine 110, other examples may include a single engine controller 140 for more than one engine of the aerial vehicle 100. Alternatively, each engine 110 may be controlled by more than one engine controller 140. In addition, the engine controllers 140 may communicate with an aircraft computer (not shown) such as a flight control computer, flight management computer, or aircraft maintenance computer.

Although not shown, each engine controller 140 may include one or more processor(s) and one or more memory device(s). The one or more processor(s) may include any suitable processing device, such as a microprocessor, microcontroller, integrated circuit, logic device, and/or other suitable processing device. The one or more memory device(s) may include one or more computer-readable media, including, but not limited to, non-transitory computer-readable media, RAM, ROM, hard drives, non-volatile memory (NVM), electronically erasable programmable read only memory (EEPROM), flash drives, and/or other memory devices.

The one or more memory device(s) may store information accessible by the one or more processor(s), including computer-readable instructions that may be executed by the one or more processor(s). The instructions may be any set of instructions that when executed by the one or more processor(s) cause the one or more processor(s) to perform operations. The instructions may be software written in any suitable programming language or may be implemented in hardware. Additionally, and/or alternatively, the instructions may be executed in logically and/or virtually separate threads on processor(s).

The memory device(s) may also store any suitable type of data. For instance, the memory device(s) may store configuration data for the gas turbine engine. Alternatively or additionally, the memory device(s) may store health data for the gas turbine engine. The memory device(s) may also store calibration data and/or sensor data received from one or more sensors included within the engine control system.

The engine controller(s) 140 may also include a communication interface used to communicate, for example, with the other components of the aircraft 100 (e.g., via a communication network 150). The communication interface may include any suitable components for interfacing with one or more network(s), including for example, transmitters, receivers, ports, controllers, antennas, and/or other suitable components.

Still referring to FIG. 1, the engine controller(s) 140 is communicatively coupled with the communication network 150 of the aircraft 100. The communication network 150 may include, for example, a local area network (LAN), a wide area network (WAN), SATCOM network, VHF network, a HF network, a Wi-Fi network, a WiMAX network, a gatelink network, ARINC, MIL-STD-1153, Ethernet, CAN, RS-485, and/or any other suitable communications network for transmitting messages to and/or from the aircraft 100, such as to a cloud computing environment and/or the off board computing systems. Such networking environments may use a wide variety of communication protocols. The communication network 150 includes any combination of wired and/or wireless communication links. In one example embodiment, the communication network 150 includes a data bus. The communication network 150 may also be coupled to the one or more engine controller(s) 140 using any suitable communication system 160, such as through communication cables or by various wireless protocols. In addition to the aircraft communication, the engines may use a separate communication system directly between them.

The aircraft 100 of FIG. 1 is depicted by way of example, not limitation. Although much of the present disclosure is described with respect to the aircraft 100, it will be appreciated that embodiments of the disclosed technology may be used with any vehicle, such as unmanned marine vehicles and unmanned ground vehicles. For example, the disclosed control systems may be used with boats, submarines, cars, trucks, or any other vehicle capable of locomotion.

Figure 2:
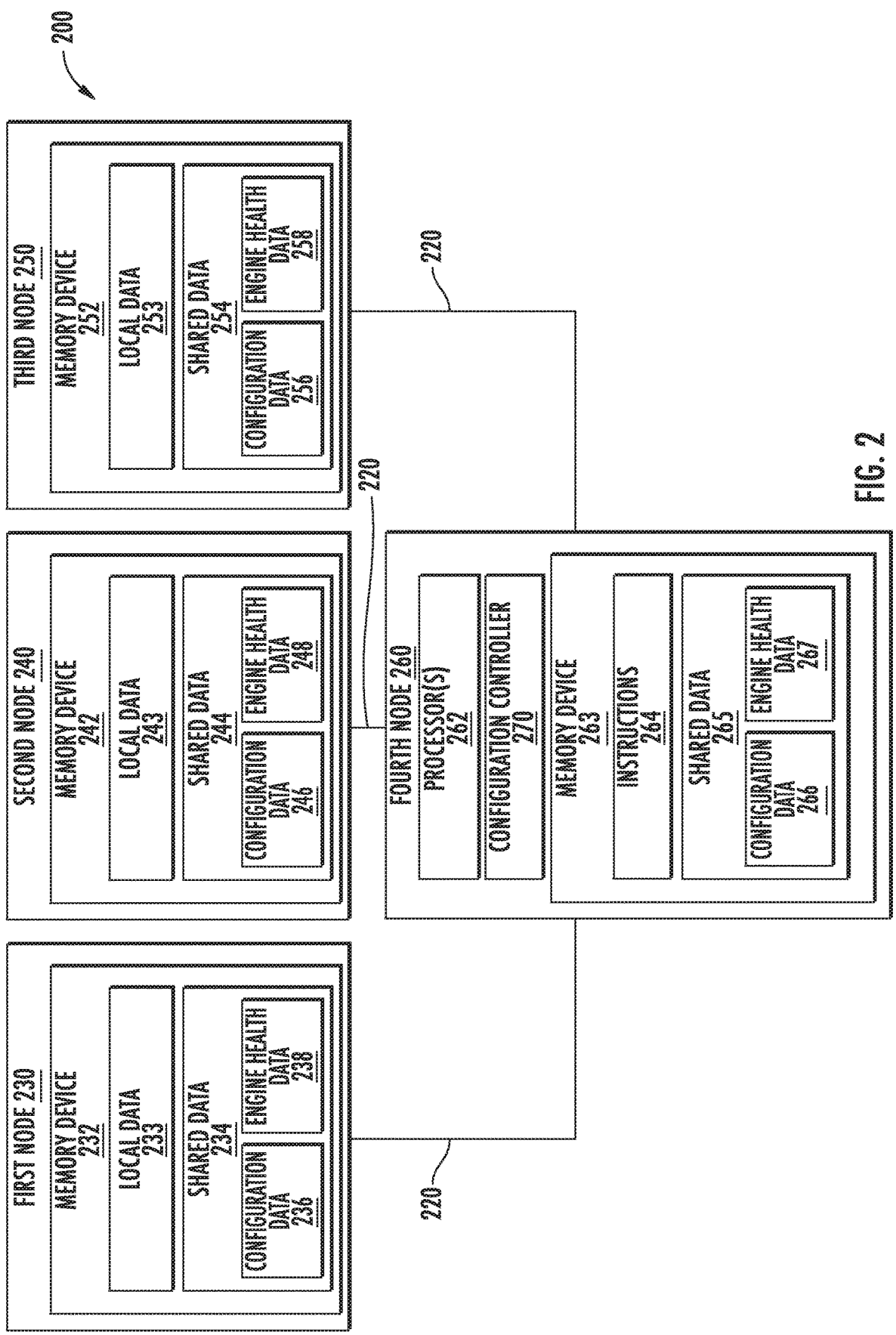
FIG. 2 illustrates a block diagram of one embodiment of a distributed control system according to the present disclosure.

Referring now to FIG. 2, a distributed control system 200 for an aircraft according to one embodiment of the present disclosure is illustrated. As shown, the distributed control system 200 may include at least three nodes, including for example, a first node 230, a second node 240, a third node 250, and a fourth node 260 communicatively coupled to the first, second, and third nodes 230, 240, 250. It should be appreciated that the first node 230, the second node 240, the third node 250, and fourth node 260 may be physically separate components. However, the nodes 230, 240, 250, 260 may be communicatively coupled using any type of communication system 220, such as via one or more communication cables or by various wireless protocols. In some implementations, the first node 230, the second node 240, and/or the third node 250 may each be at least one of a sensor, an actuator, a data concentrator, a controller, or a line-replaceable unit (LRU). For instance, the first node 230 may be a first sensor configured to detect a first operating parameter (e.g., temperature, pressure, etc.) associated with a gas turbine engine, such as one of the gas turbine engines 110 depicted in FIG. 1. Alternatively, the distributed control module at the first node 230 may be an actuator configured to control operation of one or more components (e.g., valve) of the gas turbine engine. The second and third nodes 240, 250 may include a second and third sensor configured to detect a second operating parameter associated with the gas turbine engine. The fourth node 260 may include one of the engine controllers 140 depicted in FIG. 1. In alternative embodiments, the fourth node 260 may be a flight management computer, a flight control computer, or any combination of these computers and/or controllers. In another example, the fourth node 260 may be a dedicated node, circuit, and/or processor associated with management of shared data as described herein. The fourth node 260 may include dedicated hardware and/or software configured to manage the shared data distributed at other nodes of the distributed control system 200. As will be discussed below in more detail, the nodes 230, 240, 250, 260 may each include a memory or other storage device configured to store an instance of shared data for the gas turbine engine.

As shown, the first node 230 includes a memory device 232 configured to store local data 233 and a first instance 234 of shared data for an aircraft control system for the aircraft. In example embodiments, the aircraft control system may include an engine control system for one or more gas turbine engines of the aircraft. The local data 233 may include calibration, health, or identification data for the first node 230. Alternatively or additionally, the local data 233 may include operating parameters and/or control logic. The first instance 234 of shared data is distinct from the local data 233 and includes at least one of configuration data 236 and/or engine health data 238. In certain embodiments, the configuration data 236 may include a thrust rating for the gas turbine engines 110. Alternatively or additionally, the configuration data 236 may include data indicative of one or more settings for one or more hardware modules of the aircraft or gas turbine engine. The engine health data 238 may include data indicative of a number of flight hours or operating hours for the gas turbine engine. More specifically, the flight hours can be used to determine an amount of life remaining for the gas turbine engine or one or more life limited components of the gas turbine engine. Alternatively or additionally, the engine health data may include an amount of time the gas turbine engine has operated at or above a setpoint temperature. Other examples of engine health data may be indicative of a total number of engine operating hours, engine cycle counts, engine starts, or cumulative calculated damage to engine hardware.

The second node 240 includes a memory device 242 configured to store local data 243 and a second instance 244 of shared data for the gas turbine engine. The second instance 244 of shared data may include at least one of configuration data 246 and/or engine health data 248. It should be appreciated that the configuration data 246 and/or engine health data 248 may include any of the example data mentioned above with respect to the first instance 234 of shared data. In alternative embodiments, the shared data 244 may be stored in a separate memory device.

The third node 250 includes a memory device 252 configured to store local data 253 and a second instance 254 of shared data for the gas turbine engine. The second instance 254 of shared data may include at least one of configuration data 256 and/or engine health data 258. It should be appreciated that the configuration data 256 and/or engine health data 258 may include any of the example data mentioned above with respect to the first instance 234 of shared data. In alternative embodiments, the shared data 254 may be stored in a separate memory device.

The fourth node 260 may include one or more processor(s) 262 and a memory device 263. In some implementations, the memory device 263 is configured to store computer-readable instructions 264 and a third instance 265 of shared data for the gas turbine engine. The third instance 265 of shared data may include at least one of configuration data 266 and engine health data 267. It should be appreciated that the configuration data 266 and engine health data 267 may include any of the example data mentioned above with respect to the first instance 234 of shared data. In addition, the shared data may not be pre-loaded at a factory, but set to default or read from the other nodes at initial startup.

Four nodes including instances of shared data are shown in FIG. 2 by way of example. According to various embodiments, a distributed control system may include more than four nodes or less than four nodes, each including instances of shared data.

As shown, the fourth node 260 may also include a configuration controller 270. In example embodiments, the configuration controller 270 may be implemented using hardware, software, or combinations of hardware or software. Suitable hardware may include, but is not limited to a processor, a field programmable gate-array, an application specific integrated circuit (ASIC), digital or analog electrical circuit, packaged hardware units, and the like. Suitable software may include, but is not limited to, a portion of program code that is executable by a processor to perform a particular function or set of functions, a self-contained software component, firmware, and the like. The configuration controller 270 may include software stored in a processor readable storage device to program a processor to perform the functions described herein. The configuration controller 270 may be implemented on the processor(s) 262 of the fourth node 260. Alternatively, the configuration controller 270 may be stored in a dedicated memory device (not shown) of the fourth node 260. As will be discussed below in more detail, the configuration controller 270 may monitor multiple instances of shared data within the distributed control system 200 for one or more inconsistencies.

Referring now to FIGS. 3-6, schematic views of various embodiments of the separate nodes (e.g. nodes 230, 240, 250, and/or 260) of the distributed control system 200 according to the present disclosure are illustrated. More specifically, as shown, in FIGS. 3 and 4, a distributed control system 200 having three nodes and a distributed control system 200 having four nodes are illustrated, respectively. In addition, as shown, each of the nodes are configured to store local data and shared data. More specifically, as shown, portions of the shared data are dissimilarly copied across one or more of the nodes using dissimilar methods. For example, in certain embodiments, the dissimilar methods may include striping the shared data amongst the nodes, storing parity information of the shared data amongst one or more of the nodes, storing unique identification or signatory information of the shared data amongst one or more of the nodes, storing subsets of the shared data amongst one or more of the nodes, and/or storing exact copies of the shared data amongst one or more of the nodes so as to increase redundancy of the shared data.

Thus, in certain embodiments, spreading the shared data across the nodes using the dissimilar methods is configured to accommodate a memory storage capacity of one or more of the nodes (e.g. Node 3 in FIG. 4) to be less than a memory storage capacity of another one or more of the nodes (e.g. Nodes 1, 2, and 4).

In such embodiments, the distributed control system 200 allows for variously sized nodes, with some nodes having smaller memory devices. More specifically, in one embodiment, the memory storage capacity of at least one of the nodes may be less than about one kilobit. In addition, as shown, at least two of the separate node(s) of the distributed control system 200 (e.g. Nodes 1, 2, and 3) may have a memory storage capacity that is less than a memory storage capability of another one or more of the at least four separate nodes (e.g. Node 4). However, the variably-sized nodes still provide the full amount of engine information available with the removal and replacement of any single node.

Figure 3:
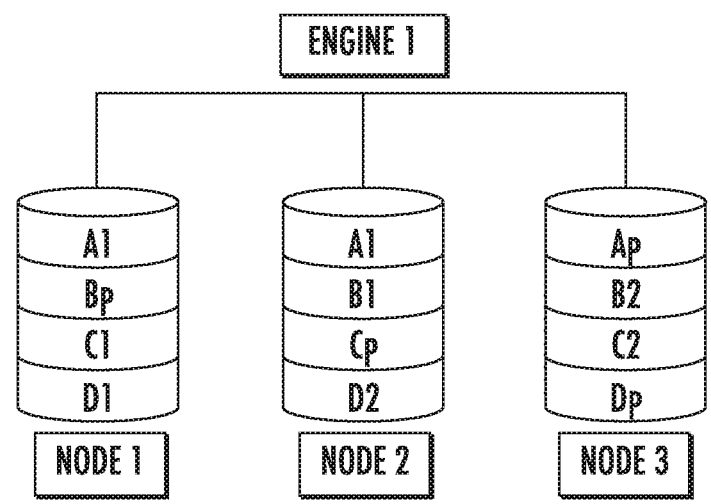
FIG. 3 illustrates a schematic diagram of one embodiment of a single engine architecture having at least three nodes, each having a memory device for storing local data and shared data, wherein portions of the shared data are dissimilarly copied across the at least three nodes using dissimilar methods according to the present disclosure.
Figure 4:
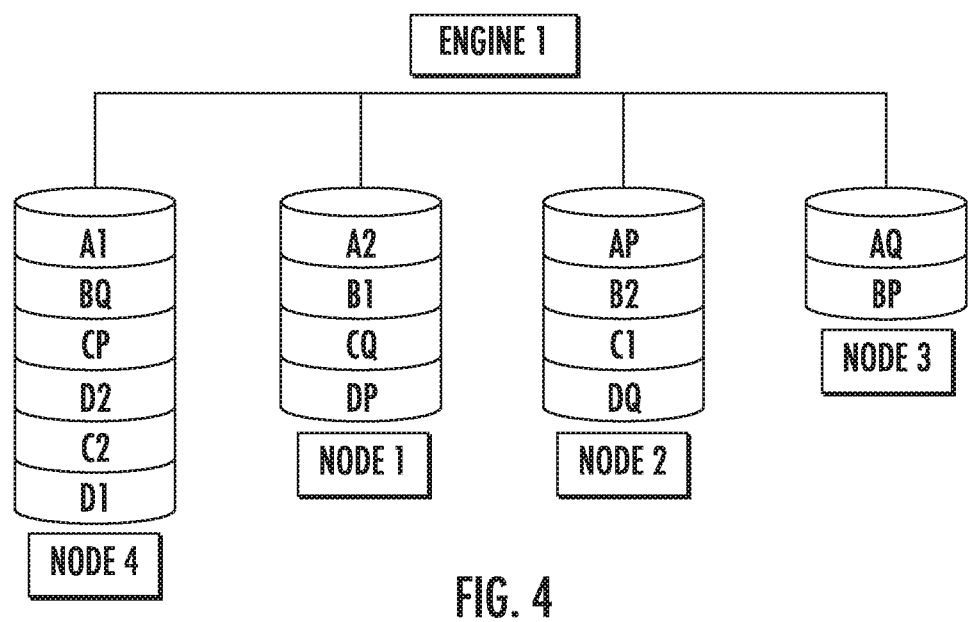
FIG. 4 illustrates a schematic diagram of one embodiment of a single engine architecture having at least four nodes, each having a memory device for storing local data and shared data, wherein portions of the shared data are dissimilarly copied across the at least four nodes using dissimilar methods according to the present disclosure.

More specifically, as shown in FIGS. 3 and 4, the distributed control system 200 may utilize redundant array of independent disks (RAID) configurations that employ the techniques of striping, mirroring, or parity to create large reliable data stores from multiple memory locations. For example, in certain instances, the distributed control system 200 may implement a RAID 5 or RAID 6 style of information management, where small amounts of the information (e.g. A1, A2, B1, B2, C1, and C2) are distributed between the different nodes, as well as parity information (AP, AQ, BP, BQ, CP, and CQ) that allows for the recreation of data if any one location is corrupted or replaced. A1 and A2 each represent portions of the data needed to recreate the entire data set A, whereas AP and AQ are the corresponding parity data.

Similarly, B1 and B2 each represent a portion of the data needed to recreate data set B, whereas BP and BQ is the corresponding parity data. It can be seen the data could be parsed into any number of separate data sets. Further, C1 and C2 each represent half of the data needed to recreate data set C, whereas CP and CQ are the corresponding parity data. Moreover, D1 and D2 each represent half of the data needed to recreate data set D, whereas DP and DQ are the corresponding parity data. Thus, any two nodes are able to recreate the full data set in the case of a loss of any one of the other nodes. Also, both Node 3 and either of Nodes 1 or 2 can be lost at the same time, and the data can be recreated. In addition, in the illustrated embodiment, data sets A and B may correspond to more important configuration data (e.g. the type of engine, etc.) or power ratings, whereas data sets C and D may correspond to less significant data such as life usage or data not need to operate the gas turbine engine. As such, the system of the present disclosure allows for optimal configuration management of redundant data according to the priority of data.

More particularly, as shown in FIGS. 2 and 4, Node 4 may include the configuration controller 270 and may include instances of shared data of the gas turbine engine (e.g. A1, BQ, CP, D2, C2, and D1). The remaining nodes (e.g. Node 1, Node 2, and Node 3) may each include separate and different instances of the shared data. For example, the shared data of Node 1 may include A2, B1, CQ, and DP. The shared data of Node 2 may include AP, B2, C1, and DQ. The shared data of Node 3 may include AQ and BP.

The data may also include summary or identification data such as checksums or hash algorism to use for memory verification. As such, overall configuration management at startup can be accomplished quicker by purely monitoring for shared checksum agreement across nodes, and not reading or recreating all of the data. Accordingly, simple nodes with less memory can also store fewer parity data sets, allowing for simpler memory requirements of those nodes, and non-symmetric parity information sharing between larger sets of nodes or unequal splits for nodes with larger memory.

Figure 5:
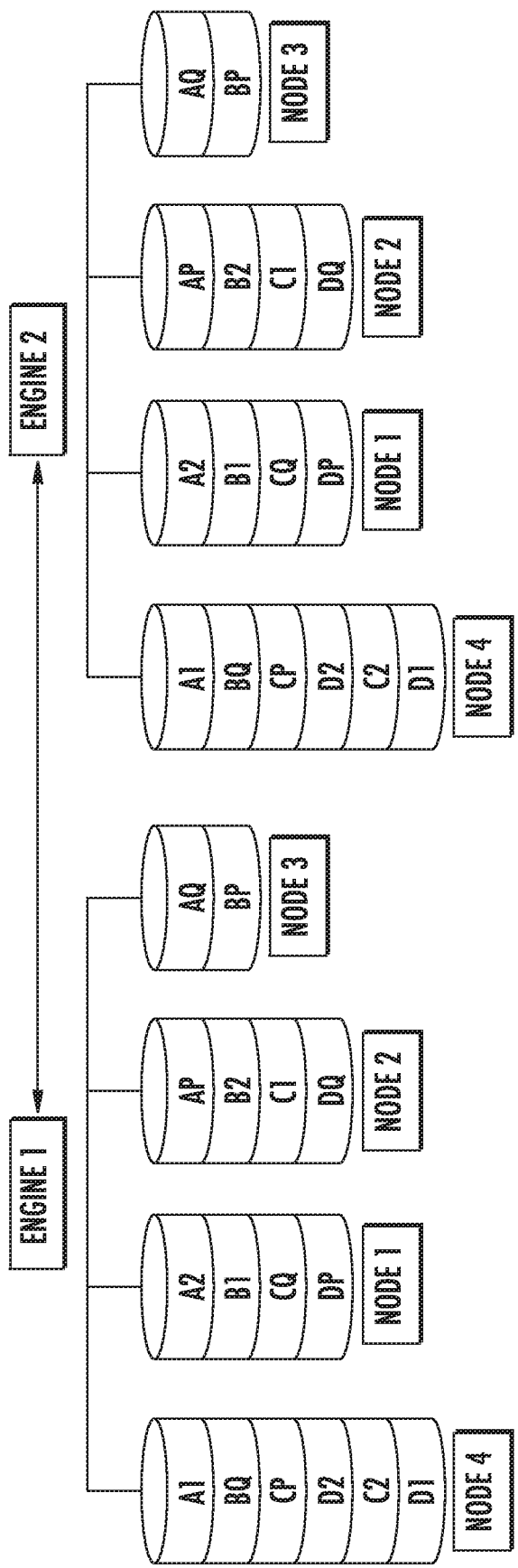
FIG. 5 illustrates a schematic diagram of one embodiment of a dual engine architecture each having at least four nodes with a memory device for storing local data and shared data, wherein portions of the shared data are dissimilarly copied across the at least four nodes using dissimilar methods according to the present disclosure.

Referring particularly to FIG. 5, for larger implementations, multiple types of parity can be used, and even split between engines (e.g. Engine 1 and Engine 2) on multi-engine aircraft or engines and aircraft. For even further reductions in memory space requirements per node, and/or for additional redundancy, common mission and configuration data can be shared between engines and aircraft nodes. In such embodiments, the vehicle control system may include a plurality of engine control systems for a plurality of gas turbine engines (e.g. Engine 1 and Engine 2), with the shared data including configuration data for the plurality of gas turbine engines and/or engine health data for the plurality of gas turbine engines.

Figure 6:
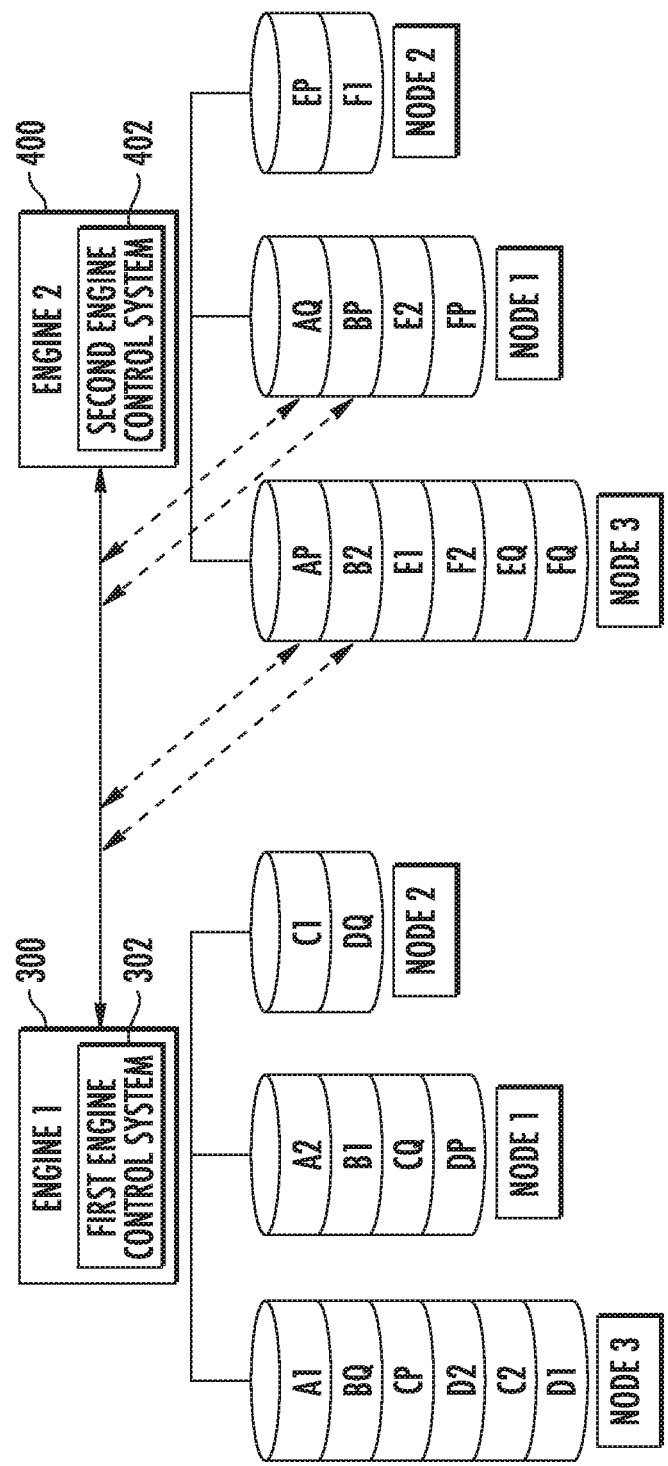
FIG. 6 illustrates a schematic diagram of another embodiment of a dual engine architecture having at least four nodes with a memory device for storing local data and shared data, wherein portions of the shared data are dissimilarly copied across the at least four nodes using dissimilar methods according to the present disclosure.

Referring now to FIG. 6, in yet another embodiment of the distributed control system 200, multiple engines may share data across a common network. In such embodiments, each of the engines is not required to store all of the data sets (e.g. A, B, C, D, E, and F), but rather, the data sets and the corresponding parity information can be split across both engines. For example, as shown, Engines 1 and 2 (labeled 300 and 400) each include first and second engine control systems 302, 402, respectively. The first and second control systems 302, 402 may each include one or more processors and one or more memory devices for storing computer-readable instructions that, when executed by the one or more processors, cause the one or more processors to perform operations, which is explained in more detail in FIG. 8.

Further, as shown, Engine 1 and Engine 2 may include only three nodes each, with the combined nodes containing all the required shared data that is needed to recreate instances of loss data. More specifically, Node 3 of Engine 1 includes shared data of A1, BQ, CP, D2, C2, and D1. In addition, in this embodiment, Node 3 of Engine 1 may contain the configuration controller 270. Node 1 of Engine 1 includes shared data of A2, B1, CQ, and DP. Node 2 of Engine 1 includes shared data of C1 and DQ, and therefore only requires a small memory capacity. Similarly, Node 3 of Engine 2 includes shared data of AP, B2, E1, F2, EQ, and FQ. In addition, in this embodiment, Node 3 of Engine 2 may also contain a configuration controller 270. Node 1 of Engine 2 includes shared data of AQ, BP, E2, and GP. Node 2 of Engine 2 includes shared data of EP and F1, which again, only requires a small memory capacity.

Figure 7:
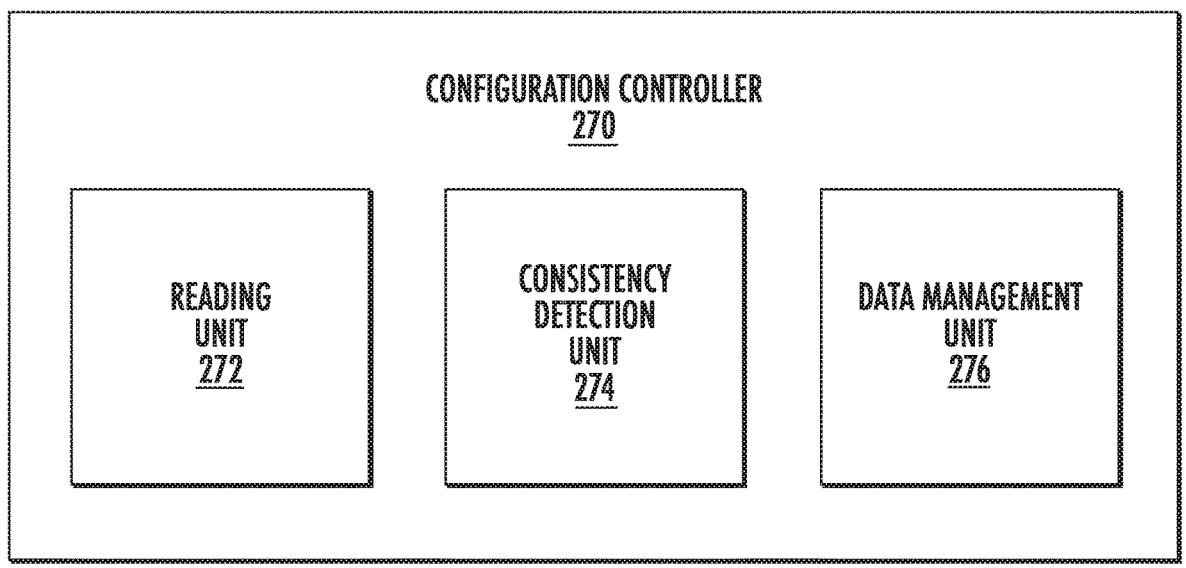
FIG. 7 illustrates a block diagram of one embodiment of a configuration controller according to the present disclosure.

Referring now to FIG. 7, a block diagram of one embodiment of the configuration controller(s) 270 according to the present disclosure is illustrated. As shown, the configuration controller 270 may be used to monitor at least the first, second, third, and/or fourth instances of shared data for one or more inconsistencies. The configuration controller 270 may be further configured to generate one or more control actions in response to detecting the one or more inconsistencies. The configuration controller(s) 270 includes a reading unit 272, a consistency detection unit 274, and a data management unit 276. The individual units of the configuration controller 270 may be configured as described above with respect to the configuration controller 270. Each unit may be implemented using software, hardware, or any combination of hardware and software. The individual units may be configured together in a single unit such as a single processing unit or may be configured in distributed components. The different units may be formed using different software and/or hardware combinations.

In example embodiments, the reading unit 272 may obtain a plurality of instances of shared data within the distributed control system 200. For instance, the reading unit 272 may obtain the first instance 234 of shared data from the first node 230, the second instance 244 of shared data from the second node 240, the third instance 254 of shared data from the third node 250, and/or the fourth instance 265 of shared data from the fourth node 260.

In several embodiments, the reading unit 272 may obtain an instance of shared data by issuing a command to one of the plurality of nodes included in the distributed control system 200. For example, the reading unit 272 may obtain the first instance 234 of shared data by issuing a read command to the first node 230. Alternatively, the nodes 230, 240, 250, 260 of the distributed control system 240 may be programmed to communicate instances of shared data to the reading unit 272 at predetermined intervals. For example, the first node 230 may be programmed to communicate the first instance 234 of shared data to the reading unit 272 every minute, or any other suitable amount of time.

In further embodiments, the consistency detection unit 274 may compare the first, second, third, and/or fourth instances 234, 244, 254, 265 of shared data to detect a shared data inconsistency therebetween. In example embodiments, the shared data inconsistency may include a consistency and/or an inconsistency. For instance, a consistency may exist between the second instance 244 and the third instance 254, whereas an inconsistency may exist between the first instance 234 and the second, third, and fourth instances 244, 254, and 265. In alternative embodiments, the shared data inconsistency may include an inconsistency between each of the first instance 234, the second instance 244, the third instance 254, and/or the fourth instance 265.

In additional embodiments, the data management unit 276 may generate one or more control actions based on the shared data inconsistency detected by the consistency detection unit 274. For instance, when the shared data inconsistency includes a consistency between instances and an inconsistency between other instances, the data management unit 276 may issue a command to overwrite or correct one of the instances 234, 244, 254, 265 of shared data to resolve the inconsistency. As an example, the data management unit 276 may issue a command to overwrite the first instance 234 with one of the second, third, or fourth instances 244, 254, 265, when the inconsistency is between the first instance 234 and the second, third, or fourth instances 244, 254, 265.

When the shared data inconsistency exists between each of the first, second, third, and fourth instances 234, 244, 254, 265 of shared data or at least half of the instances 234, 244, 254, 265 of shared data, the control action may include generating a notification to perform a maintenance action on at least one of the first node 230, the second node 240, the third node 250, or the fourth node 260. An example of a maintenance action may include, without limitation, generating lost data, replacing failed units, or replacing data for at least one of the first node 230, the second node 240, the third node 250, or the fourth node 260.

Alternatively, at least one of the first node 230, the second node 240, the third node 250, or the fourth node 260 may be reprogrammed using a ground service interface. In one embodiment, the system is configured to determine a valid instance of shared data and copy the valid instance to each of the nodes when the inconsistency is between each instance of shared data. An indication of the valid instance may be provided by a user in one example, or determined by other techniques. In another embodiment, the control action may also include issuing a command to operate the gas turbine engine in a fail-safe operating mode. In this manner, the gas turbine engine may continue to operate in a safe manner despite the shared data inconsistency.

Figure 8:
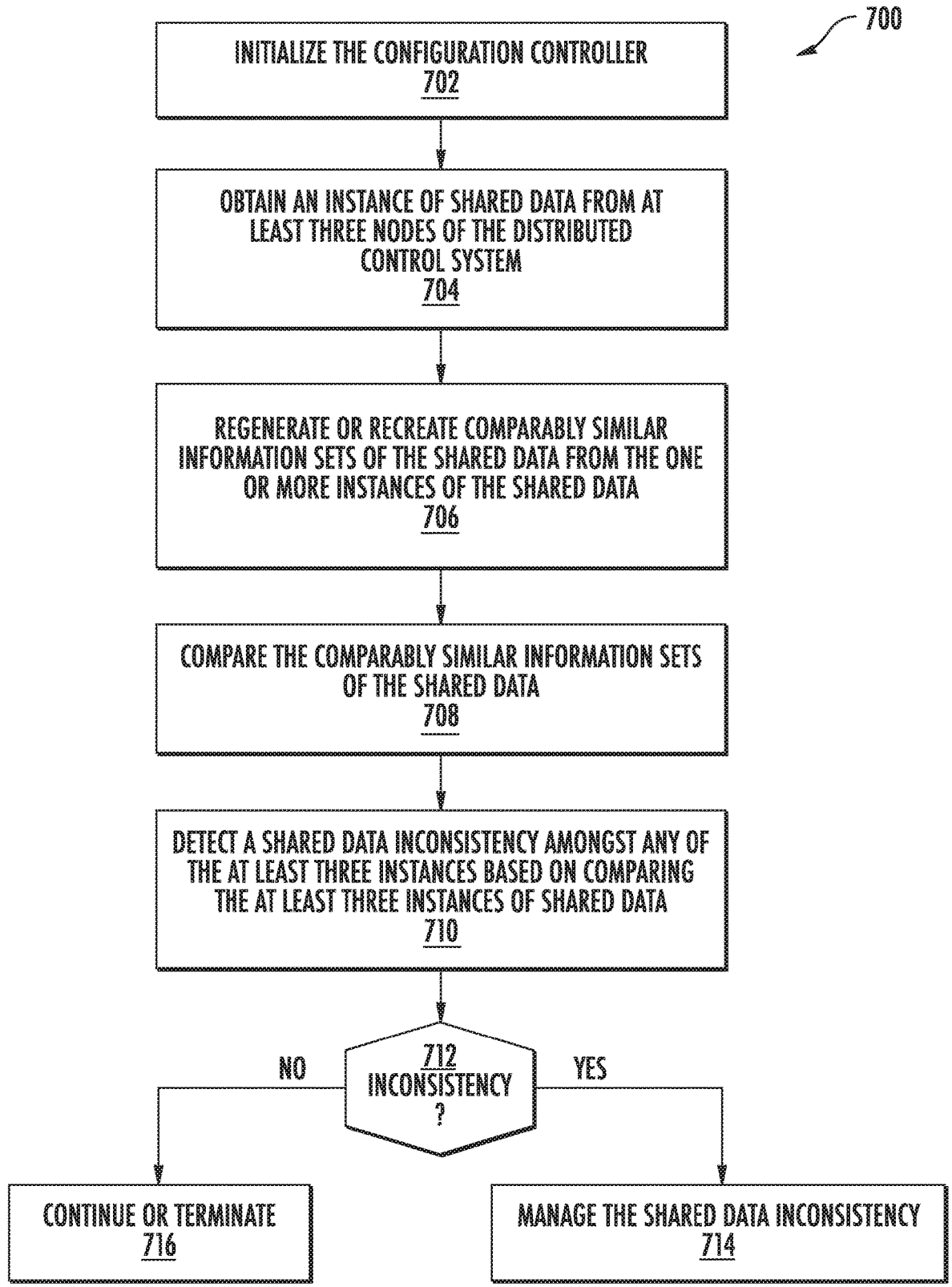
FIG. 8 illustrates a flow diagram of one embodiment of a method for managing gas turbine engine data configuration according to the present disclosure.

Referring now to FIG. 8, a flow diagram of an example method for managing gas turbine engine data configuration according to the present disclosure is illustrated. The method 400 may be implemented using, for instance, the configuration controller(s) 270 discussed above with reference to FIGS. 2-7. FIG. 8 depicts steps performed in a particular order for purposes of illustration and discussion. Those of ordinary skill in the art, using the disclosures provided herein, will understand that various steps of the method 700 or any of the other methods disclosed herein may be adapted, modified, rearranged, performed simultaneously or modified in various ways without deviating from the scope of the present disclosure.

As shown at (702), the method 700 includes initializing the configuration controller 270. In some implementations, for example, initializing the configuration controller 270 occurs each time the fourth node 260 of the distributed control system 200 is activated. The configuration controller 270 may be initialized when powering-up the fourth node 260, resetting the fourth node 260, or in response to other events. It should be appreciated, however, that the configuration controller 270 may be associated with any one of the plurality of nodes of the distributed control system 200.

As shown at (704), the method 700 includes obtaining an instance of shared data from at least three nodes of the distributed control system 200. As an example, the reading unit 272 of the configuration controller 270 may obtain the first, second, third, and fourth instances 234, 244, 254, 265 of shared data from the first, second, third, and fourth nodes 230, 240, 250, 260, respectively. In another embodiment, where only three nodes are used (FIG. 3), the third node 250 may include the configuration controller 270 such that the reading unit 272 of the configuration controller 270 may obtain the first, second, and third instances 234, 244, 254 of shared data from the first, second, and third nodes 230, 240, 250, respectively.

As mentioned, the shared data may be dissimilarly copied across the at least three nodes using dissimilar methods. Thus, as shown at (706), the method 700 may include generating or creating comparably similar information sets of the shared data from the one or more instances of the shared data. In one embodiment, for example, the configuration controller 270 is configured to regenerate the shared data of each the at least three instances using the striping, the parity information, and/or the exact copies of the shared data. In other words, before comparison, the configuration controller 270 is adapted to regenerate or recreate the dissimilar instances of the shared data such that direct comparisons can be made. Accordingly, as shown at (708), the method 700 includes comparing the comparably similar information sets of the shared data obtained at (706).

As shown at (710), the method 700 includes detecting a shared data inconsistency amongst any of the at least three instances based on comparing the at least three instances of shared data. More specifically, in certain embodiments, the consistency detection unit 274 of the configuration controller 270 may compare the at least three instances of shared data to determine whether the shared data inconsistency exists amongst the multiple instances of shared data. The consistency detection unit may apply hashing, parity information and/or checks, checksum algorithms, or any other suitable technique to detect inconsistencies in data. As an example, the consistency detection unit 274 may be configured to compare only an identifier (e.g., checksum, parity bit) associated with each instance of the at least three instances. In this manner, the instances can be compared in a more efficient manner and entire data sets are not required to be recreated.

In example embodiments, comparing multiple instances of the shared data may include comparing the first instance of shared data, the second instance of shared data, the third instance of shared data, and the fourth instance of shared data. In this manner, the consistency detection unit 274 of the configuration controller 270 may determine whether a shared data inconsistency exists amongst the instances of shared data.

At (712), the method 700 includes determining whether a shared data inconsistency exists. A shared data inconsistency may exist when an inconsistency exists between at least one of the instances of shared data. For example, a shared data inconsistency may exist when the first and second nodes are storing consistent instances, but the third node is not storing an instance of the corresponding shared data. Alternatively, a shared data inconsistency may exist when an inconsistency exists between each of the at least three nodes of the distributed control system 200. As will be discussed below in more detail, the method 700 proceeds to (714) when the consistency detection unit determines a shared data inconsistency exists. Otherwise, the method 700 proceeds to (716).

At (714), the method 700 includes managing a shared data inconsistency detected at (712). More specifically, the data management unit 276 of the configuration controller 270 may be used to manage the shared data inconsistency. In example embodiments, managing the shared data inconsistency may include generating one or more control actions. As will be discussed below, the control actions may vary based on the shared data inconsistency detected at (712).

If, when the shared data inconsistency is detected at (712), a shared data consistency amongst a majority of the at least three instances is also detected, the one or more control actions may include overwriting any minority instances (e.g., an inconsistent instance) of the at least three instances with one of the majority instances (e.g., consistent instances). In one example embodiment, a shared data inconsistency detected at (712) may include a consistency between the second instance and the third instance. In addition, the shared data inconsistency may include an inconsistency between the first instance and the second and third instances. As such, managing the shared data inconsistency may include overwriting the first instance of shared data with one of the second or third instances of shared data. In this manner, the shared data inconsistency may be resolved.

In example embodiments, the distributed control system 200 may include more than four nodes. For instance, the distributed control system 200 may include five separate nodes, and each node may include one or more instances of shared data. As such, a shared data inconsistency detected at (712) may include a shared data consistency amongst the first, second, and third nodes. In addition, both the fourth and fifth instances of shared data may be inconsistent with the first, second, and third instances of shared data. As such, managing the shared data inconsistency may include overwriting the fourth and fifth instances of shared data with one of the first, second or third instances of shared data. This may also include using the information in the first, second, or third instances of shared data to recreate the data in the fourth and fifth node using the parity algorithms. In this manner, the shared data inconsistency may be resolved.

When the shared data inconsistency detected at (712) includes an inconsistency between each of the at least three instances, the control action(s) may include generating a notification to perform a maintenance action on at least one of the at least three nodes of the distributed control system 200. For instance, the maintenance action may include, without limitation, replacing at least one of the first, second, third, or fourth nodes. In another example, a maintenance action may include repairing, reprogramming, or creating a new instance of the shared data at each of the nodes. Alternatively or additionally, the control action(s) may include issuing a command to operate the gas turbine engine in a fail-safe operating more. In this manner, the gas turbine engine may continue to operate in a safe manner despite the shared data inconsistency.

Still referring to FIG. 8, as shown at (716), the method 700 may terminate. Alternatively, the method 700 may continue. Various processes may be performed at (716). For example, (716) may include monitoring shared data stored at various nodes of the distributed control system 200. In this manner, the shared data may be continuously monitored for one or more inconsistencies.

For example, the method may revert to (704) at (716) when a change to any node or instance of shared data is detected. In some examples, the configuration controller 270 may be deactivated at (716), either immediately after verifying data consistency or after a predetermined amount of time. In alternative embodiments, the configuration controller may, as shown at (716), be configured to detect the gas turbine engine operating in one of a plurality of pre-defined operating states, such as a shutdown state in which the gas turbine engine is powering down. When the configuration controller 270 determines the gas turbine engine is operating in one of the plurality of pre-defined operating states, the configuration controller 270 may be configured to overwrite each instance of data such as shared engine health data with updated engine health data. In this manner, the distributed control system 200 can maintain up-to-date engine health data indicating a remaining life of the gas turbine engine or one or more life-limited components thereof.

Figure 9:
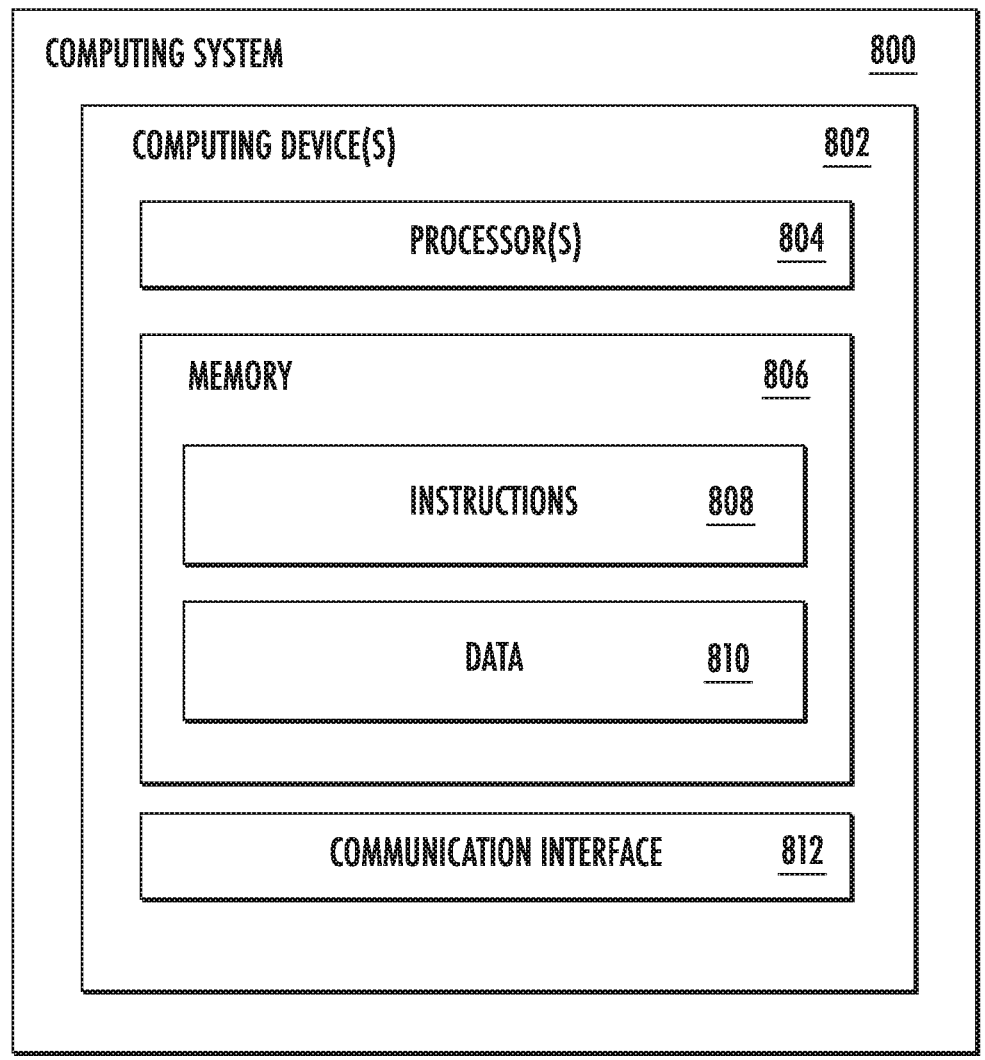
FIG. 9 illustrates a block diagram of one embodiment of a computing system according to the present disclosure.

Referring to FIG. 9, a block diagram of an example computing system 800 that may be used by a distributed control system, or other systems to implement methods and systems according to example embodiments of the present disclosure. For example, the example computing system 800 may represent components of the configuration controller 270, the various nodes described herein, the engine control systems, and/or any other suitable computing system.

Accordingly, as shown, the computing system 800 may include one or more computing device(s) 802. The one or more computing device(s) 802 may include one or more processor(s) 804 and one or more memory device(s) 806. The one or more processor(s) 804 may include any suitable processing device, such as a microprocessor, microcontroller, integrated circuit, logic device, system on a chip, or other suitable processing device. The one or more memory device(s) 806 may include one or more computer-readable media, including, but not limited to, non-transitory computer-readable media, RAM, ROM, hard drives, flash drives, or other memory devices.

The one or more memory device(s) 806 may store information accessible by the one or more processor(s) 804, including computer-readable instructions 808 that may be executed by the one or more processor(s) 804. The instructions 808 may be any set of instructions that when executed by the one or more processor(s) 804, cause the one or more processor(s) 804 to perform operations. The instructions 808 may be software written in any suitable programming language or may be implemented in hardware. In some embodiments, the instructions 808 may be executed by the one or more processor(s) 804 to cause the one or more processor(s) 804 to perform operations, such as implementing one or more of the processes mentioned above.

The memory device(s) 804 may further store data 810 that may be accessed by the processor(s) 804. For example, the data 810 may include a third instance of shared data for a gas turbine engine, as described herein. The data 810 may include one or more table(s), function(s), algorithm(s), model(s), equation(s), etc. according to example embodiments of the present disclosure.

The one or more computing device(s) 802 may also include a communication interface 812 used to communicate, for example, with the other components of system, another engine, or the aircraft. The communication interface 812 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A distributed control system for a vehicle, comprising:
a configuration controller;
at least three nodes communicatively coupled to the configuration controller, each of the at least three nodes comprising a memory device for storing local data and portions of shared data of the distributed control system,
wherein the portions of the shared data are dissimilarly copied across the at least three nodes using dissimilar methods,
wherein the dissimilar methods comprise at least one of striping the shared data amongst the at least three nodes, storing parity information of the shared data amongst at least one of the at least three nodes, storing unique identification or signatory information of the shared data amongst at least one of the at least three nodes, storing subsets of the shared data amongst the at least three nodes, and/or storing exact copies of the shared data amongst at least one of the at least three nodes so as to increase redundancy of the shared data, and
wherein the vehicle control system comprises an engine control system for a gas turbine engine, the shared data comprising at least one of configuration data for the gas turbine engine or engine health data for the gas turbine engine, and wherein the configuration data comprises at least one of a thrust rating for the gas turbine engine and/or calibration data for one or more components of the gas turbine engine and wherein the engine health data comprises at least one of data indicating a number of flight hours or operating hours for the gas turbine engine, data indicating a number of cycle events for the gas turbine engine, or data indicating a number of times the gas turbine engine has been operated at one or more predefined conditions.

2. The distributed control system of claim 1, wherein the dissimilar methods accommodate a memory storage capacity of the at least one of the three nodes being less than a memory storage capacity of another one or more of the at least three nodes.

3. The distributed control system of claim 1, wherein storing subsets of the shared data amongst the at least three nodes further comprises defining the subsets based on a priority of each of the subsets of the shared data.

4. The distributed control system of claim 3, wherein the subsets of the shared data, data redundancy, the parity information, and/or subset definitions are dynamically allocated and modified based on the current criticality of the data.

5. The distributed control system of claim 1, wherein striping the shared data amongst each of the at least three nodes and/or storing the parity information of the shared data amongst each of the at least three nodes further comprises storing the shared data using a redundant array of independent disks (RAID) methodology.

6. The distributed control system of claim 1, wherein the configuration controller is configured to perform a plurality of operations, comprising:
obtaining an instance of the shared data for the vehicle control system from the at least three separate nodes, at least two of the instances being dissimilar;
regenerating comparably similar information sets of the shared data from the instances of the shared data including the dissimilar instances of the shared data;
comparing the comparably similar information sets of the shared data;
detecting a shared data inconsistency amongst any of the at least three nodes based on the comparison; and
responsive to detecting the shared data inconsistency, generating a control action associated with resolving the shared data inconsistency.

7. The distributed control system of claim 6, wherein the configuration controller performs the plurality of operations each time the distributed control system is initialized.

8. The distributed control system of claim 1, wherein each node of the at least three nodes comprises at least one of a sensor, actuator, data concentrator, or controller.

9. The distributed control system of claim 1, wherein the parity information comprises at least one of a parity of the subsets of shared data, checksums of the shared data, and/or hashs of the shared data.

10. The distributed control system of claim 1, wherein the vehicle control system comprises a plurality of engine control systems for a plurality of gas turbine engines, the shared data comprising at least one of configuration data for the plurality of gas turbine engines or engine health data for the plurality of gas turbine engines.

11. A distributed vehicle control system, comprising:
a first engine control system associated with a first gas turbine engine of a vehicle and a second engine control system associated with a second gas turbine engine of the vehicle, the first and second engine control systems each comprising a configuration controller and at least three nodes communicatively coupled thereto, each of the at least three nodes comprising a memory device for storing local data and portions of shared data of the first and second engine control systems,
wherein the portions of the shared data are dissimilarly copied across the at least three nodes using dissimilar methods,
wherein the dissimilar methods comprise at least one of striping the shared data amongst the at least three nodes, storing parity information of the shared data amongst at least one of the at least three nodes, storing unique identification or signatory information of the shared data amongst at least one of the at least three nodes, storing subsets of the shared data amongst the at least three nodes, and/or storing exact copies of the shared data amongst at least one of the at least three nodes so as to increase redundancy of the shared data, and
wherein the at least three nodes of each of first and second engine control systems are configured to share data thereacross.

12. The distributed vehicle control system of claim 11, wherein each of the configuration controllers of the first and second engine control systems is configured to perform a plurality of operations, comprising:
obtaining an instance of the shared data from the at least three separate nodes of the first and second engine control systems, at least two of the instances being dissimilar;
regenerating comparably similar information sets of the shared data from the instances of the shared data including the dissimilar instances of the shared data;
comparing the comparably similar information sets of the shared data;

detecting a shared data inconsistency amongst any of the at least three nodes based on the comparison; and responsive to detecting the shared data inconsistency, generating a control action associated with resolving the shared data inconsistency.

13. The distributed vehicle control system of claim 12, wherein regenerating comparably similar information sets of the shared data from the instances of the shared data including the dissimilar instances of the shared data further comprises:

regenerating the shared data of each the at least three instances using the striping, the parity information, and/or the exact copies of the shared data.

14. The distributed vehicle control system of claim 11, wherein the parity information comprises at least one of subsets of the shared data, checksums, and/or hashs of the shared data.

15. A method for managing gas turbine engine data configuration, comprising:

responsive to detecting initialization of an engine controller for a gas turbine engine, obtaining, by one or more processors of a distributed control system, one or more instances of shared data for an engine control system for the gas turbine engine from each of at least three nodes of the distributed control system, the shared data being dissimilarly copied across the at least three nodes using dissimilar methods;

creating comparably similar information sets of the shared data from the one or more instances of the shared data;

comparing, by the one or more processors, the comparably similar information sets of the shared data;

detecting, by the one or more processors, a shared data inconsistency amongst any of the at least three instances based on comparing the at least three instances of shared data; and responsive to detecting the shared data inconsistency, generating a control action associated with resolving the shared data inconsistency, wherein generating the control action comprises issuing a control command to operate the gas turbine engine in a fail-safe operating mode.

16. The method of claim 15, wherein the dissimilar methods comprise at least one of striping the shared data amongst the at least three nodes, storing parity information of the shared data amongst at least one of the at least three nodes, storing unique identification or signatory information of the shared data amongst at least one of the at least three nodes, storing subsets of the shared data amongst the at least three nodes, and/or storing exact copies of the shared data amongst at least one of the at least three nodes so as to increase redundancy of the shared data.

17. The method of claim 15, wherein the parity information comprises at least one of subsets of the shared data, checksums, and/or hashs of the shared data.

* * * * *